(12) United States Patent
Zhu et al.

(10) Patent No.: US 9,008,238 B2
(45) Date of Patent: Apr. 14, 2015

(54) APPARATUS, METHOD AND RECEIVING TERMINAL FOR LDPC DECODING

(75) Inventors: Dalin Zhu, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 481 days.

(21) Appl. No.: 13/327,997

(22) Filed: Dec. 16, 2011

(65) Prior Publication Data

US 2012/0195399 A1 Aug. 2, 2012

(30) Foreign Application Priority Data

Jan. 27, 2011 (CN) .......................... 2011 1 0034988

(51) Int. Cl.
*H04L 27/06* (2006.01)
*H04L 25/02* (2006.01)
*H04L 1/00* (2006.01)

(52) U.S. Cl.
CPC .......... *H04L 25/0226* (2013.01); *H04L 1/0046* (2013.01); *H04L 1/0057* (2013.01)

(58) Field of Classification Search
CPC .............. H04L 27/2647; H04L 25/022; H04L 25/03171; H04L 25/067
USPC .................................. 375/341, 316, 340, 346
See application file for complete search history.

(56) References Cited

U.S. PATENT DOCUMENTS

| | | | |
|---|---|---|---|
| 2005/0141626 A1* | 6/2005 | Lee et al. .................... | 375/260 |
| 2006/0062322 A1* | 3/2006 | Namgoong et al. .......... | 375/285 |
| 2007/0070879 A1* | 3/2007 | Yoshida et al. ............... | 370/208 |
| 2007/0149242 A1* | 6/2007 | Kim et al. ..................... | 455/525 |

FOREIGN PATENT DOCUMENTS

| | | |
|---|---|---|
| JP | 2008514124 A | 5/2008 |
| JP | 2009188640 A | 8/2009 |

OTHER PUBLICATIONS

Jilei Hou, et al., "Performance Analysis and Code Optimization of Low Density Parity-Check Codes on Rayleigh Fading Channels," IEEE Journal on Selected Areas in Communications, May 2001, pp. 924-934, vol. 19, No. 5.

Ming Lei et al., "Virtual Channel based LLR Calculation for LDPC Coded SC-FDE System in 60-GHz WPAN," IEEE Globecom 2008, Dec. 2008, pp. 1-4.

(Continued)

*Primary Examiner* — Shuwang Liu
*Assistant Examiner* — David S Huang
(74) *Attorney, Agent, or Firm* — Sughrue Mion, PLLC

(57) ABSTRACT

An apparatus and a method for Low-density parity-check (LDPC) decoding are provided. The apparatus for LDPC decoding comprises a post effective noise variance estimation unit for estimating a post effective noise variance based on a preamble in a received signal, an LLR calculation unit for calculating an LLR based on the estimated post effective noise variance, and a decoding unit for performing LDPC decoding based on the calculated LLR. The post effective noise variance estimation unit comprises a channel frequency response estimation unit for estimating a channel frequency response based on the preamble in the received signal, a noise variance estimation unit for estimating a noise variance based on the preamble in the received signal, and a post effective noise variance calculation unit for calculating the post effective noise variance based on the channel frequency response and the noise variance.

17 Claims, 5 Drawing Sheets

(56) References Cited

OTHER PUBLICATIONS

Office Action dated Jun. 4, 2013 issued by the Japanese Patent Office in counterpart Japanese Application No. 2011241159.
Tadashi Wadayama, "Introduction to Low Density Parity Check Codes and the Sum-Product Algorithm", Japan, TRICEPS Co., Ltd., Jun. 5, 2002, pp. 92-98, ISBN4-99657-222-7.

Communication dated Feb. 11, 2014, issued by the State Intellectual Property Office of the People's Republic of China in corresponding Application No. 201110034988.X.
Lei et al., "A Soft Output Information Calculation Method for SC-FDE", Journal of Electronics & Information Technology, Aug. 2008, vol. 30, No. 8, 4 total pages.

* cited by examiner

APPARATUS, METHOD AND RECEIVING TERMINAL FOR LDPC DECODING

FIELD OF THE INVENTION

The invention relates to the field of short-range wireless communication, and more particularly, to an apparatus, a method and a receiving terminal for LDPC decoding in 60 GHz millimeter-wave wireless communications.

BACKGROUND OF THE INVENTION

Single-carrier block transmission (SCBT) (also referred as SC-FDE) and orthogonal frequency domain multiplexing (OFDM) have been adopted in IEEE 802.11ad and 802.15.3c as two physical layer (PHY) transmission schemes. Comparing with OFDM, SCBT exhibits lower peak-to-average power ratio (PAPR), and is less sensitivity to carrier frequency offset (CFO). By employing frequency domain equalization (FDE), SC-FED has comparable receiver complexity with respect to OFDM, and the inter-symbol interference (ISI) caused by the multi-path effects can be well suppressed. Due to these facts, SC-FDE is being considered as one importance technique to support high data rate, high performance millimeter-wave (MMW) WLAN/WPAN operating at 60 GHz. Single-carrier frequency domain equalization (SC-FDE) has been standardized as an alternative of orthogonal frequency division multiplexing (OFDM) in IEEE 802.11ad and 802.15.3c, which are specifications regarding 60-GHz communications. In addition, with the use of low density parity-check (LDPC) codes, multi-Giga bits transmission can be supported in MMW WLAN/WPAN with desired decoding complexity.

In general, LDPC coding has following advantages over conventional Turbo coding, making it better suited for very high rate data transmission: stronger error detection and correction capability, lower decoding complexity, and more flexible coding rate and block length. However, in order to perform LDPC decoding in SC-FDE, log-likelihood ratio (LLR) has to be known as a priori. LLR calculation involves the estimation of effective channel gain and noise power, which will be changed due to FDE.

FIG. 1 is a block diagram showing a conventional SC-FDE receiver 100 for LDPC decoding. As shown in FIG. 1, a received data stream is first pulse filtered in pulse filter 101. Then, demultiplexer 103 de-multiplexes preambles from the payload data to facilitate channel estimation. Channel frequency response estimation unit 109 and noise variance estimation unit 111 estimate a channel frequency response (CFR) and a signal-to-noise ratio (SNR) according to the preambles, respectively. After guard interval (GI) removal in guard interval removal unit 105, FFT unit 107 performs fast Fourier transform (FFT) on the payload data to transfer it from the time domain to the frequency domain. Then, MMSE frequency domain equalizer 113 performs a minimum mean squared error FDE (MMSE-FDE) on the FFT-ed data to eliminate ISI based on MMSE-FDE coefficients which are calculated based upon the preamble estimated CFR and the SNR. We note that since MMSE-FDE exhibits much better performance than zero-forcing FDE (ZF-FDE), and we only consider MMSE-FDE here. It is obvious that ZF-FDE is also applicable. After that, IFFT unit 115 performs inverse FFT (IFFT) to transfer the data stream outputted from MMSE frequency domain equalizer 113 from the frequency domain back to the time domain. LLR calculation unit 117 calculates an LLR based on the preamble estimated CFR and the SNR, and forwards it to LDPC decoding unit 119, which performs constellation de-mapping and LDPC decoding to obtain the desired bit stream.

We assume s as the coded bit, where s∈{0,1}. The LDPC coded bit stream is a symmetric binary sequence. Therefore, by referring to reference document 1, we have $$q = \log\frac{Pr(s=0\mid \tilde{r}, \alpha)}{Pr(s=1\mid \tilde{r}, \alpha)} = \frac{2}{\tilde{\sigma}^2}\alpha\tilde{r}, \quad (1)$$

where $\tilde{r}$, $\alpha$ and $\tilde{\sigma}^2$ represent the received data symbols, effective channel gain and noise power, respectively. Since the preamble is only used for channel estimation but not equalized along with the payload data, the conventional method employed in IEEE 802.11ad/15.3c is to directly input the preamble estimated CFR and noise variance to the LLR calculation unit. As shown in FIG. 1, output from channel frequency response estimation unit 109 and noise variance estimation unit 111 are directly inputted in LLR calculation unit 117 for LLR calculation.

Obviously, this method fails to provide accurate soft information to the LDPC decoding as the channel frequency response and noise variance are changed due to FDE.

Reference document 2 proposes a virtual channel (VC) based LLR calculation method for LDPC decoding in SC-FDE. The VC based method proposed in reference document 2 utilizes a so-called Unique Word (UW), and takes the effect brought out by FFT, FDE and IFFT into account to track post effective channel condition.

FIG. 2 is a block diagram showing a receiver 200 for LDPC decoding by using the VC based LLR calculation method proposed in reference document 2. Pulse filter 201, demultiplexer 203, guard interval removal unit 205, FFT unit 207, channel frequency response estimation unit 209, noise variance estimation unit 211, MMSE frequency domain equalizer 213, IFFT unit 215, LLR calculation unit 217 and LDPC decoding unit 219 shown in FIG. 2 are similar to pulse filter 101, demultiplexer 103, guard interval removal unit 105, FFT unit 107, channel frequency response estimation unit 109, noise variance estimation unit 111, MMSE frequency domain equalizer 113, IFFT unit 115, LLR calculation unit 117 and LDPC decoding unit 119 shown in FIG. 1, and the detailed description thereof are omitted here.

As shown in FIG. 2, receiver 200 further comprises post effective channel gain estimation unit 221 and post effective noise power estimation unit 223 for estimating a post effective channel gain and a post effective noise power from the signals outputted from IFFT unit 215, respectively, and inputting the estimated post effective channel gain and post effective noise power to LLR calculation unit 217 to obtain LLR according to the equation (1).

FIG. 3 shows a conventional cyclic prefix (CP) based frame structure and a UW based frame structure, where $T_G$, $T_D$ and $T_{FFT}$ represent the length of GI, data block and FFT block, respectively. The difference between conventional CP based frame structure and the UW based frame structures is pretty straightforward. In the conventional frame structure, CP is simply copied from the last part of each data block, as shown in FIG. 3. Hence, we have $T_{FFT}=T_G$. In the UW based frame structure, a pseudo-random bipolar sequence is inserted between two adjacent data blocks. Since each FFT block contains both the data block and the attached UW, we have $T_{FFT}=T_G+T_D$. Therefore, the spectral efficiency per FFT block of UW is calculated as $$\eta = \frac{T_D}{T_{FFT}} = \frac{T_D}{T_D + T_G}. \quad (2)$$

Obviously, we can see that UW based frame structure is less spectrally efficient than CP based scheme ($\eta=1$) per FFT block.

Next, we briefly introduce the use of UW to estimate LLR parameters.

At the receiver end, the received time domain signal can be written as $$r(t)=x(t)\otimes h(t)+n(t), \quad (3)$$

where x(t) is the transmitted signal, h(t) denotes the channel impulse response (CIR) and n(t) is the additive white Gaussian noise with variance $\sigma^2$. Here, $\otimes$ represents the convolution product operation.

After FFT, FDE and IFFT shown in FIG. 2, the final output signal can be modeled as (assuming ISI is well suppressed by FDE)

$$\tilde{r}(t) \approx \alpha x(t)+\tilde{n}(t), \quad (4)$$

where $\alpha$ and ñ(t) denote the post effective channel gain and the post effective noise with variance $\tilde{\sigma}^2$. After down-sampling, we can rewrite (4) in discrete forms, i.e., $$\tilde{r}_k \approx \alpha x_k + \tilde{n}_k, \quad (5)$$

where k represents the time index.

As mentioned above, a UW consists of a pseudo-random bipolar sequence with elements from $\{+1,-1\}$. Depending on the original sign (+ or –), the equalized UW can be categorized into "+" sub-sequence, i.e., $$\tilde{r}_k^+ \approx \alpha(+1)+\tilde{n}_k^+, \quad (6)$$

and "–" sub-sequence $$\tilde{r}_k^- \approx \alpha(-1)+\tilde{n}_k^-, \quad (7)$$

respectively. By referring to reference document 2, the post effective channel gain and noise power can be estimated via UW as $$\alpha = \frac{E(\tilde{r}_k^+) - E(\tilde{r}_k^-)}{2}, \quad (8)$$

and $$\tilde{\sigma}^2 = \frac{E[(\tilde{r}_k^+ - E(\tilde{r}_k^+))^2] + E[(\tilde{r}_k^- - E(\tilde{r}_k^-))^2]}{2}. \quad (9)$$

By substituting (8) and (9) into (1), the LLR is obtained for LDPC decoding.

It can be seen from the introduction above that the performance improvement obtained by a VC based scheme is limited due to the limited length of UW, the SNR degradation caused by the insertion of UW, the lower spectral efficiency compared with the conventional scheme. These occur because the UW occupies the bandwidth prepared for the actual payload data transmission.

Therefore, there needs a novel LDPC decoding method which improves error correction performance while keeps the system spectral efficiency.

Reference Documents

[1] J. Hou, P. H. Siegel, and L. B. Milstein, "Performance analysis and code optimization of low density parity-check codes on Rayleigh fading channels" in *IEEE Journal on Selec. Areas in Comm.*, vol. 19, May 2001, pp. 924-934;

[2] M. Lei, S. Zhang, K. Chen, Y. Huang, X. Wu, and L. Yan, "Virtual channel based LLR calculation for LDPC coded SC-FDE system in 60-GHz WPAN" in *IEEE Globecom* 2008, December 2008.

SUMMARY OF THE INVENTION

In view of the disadvantages of the prior art, the present invention proposes a non-virtual channel (NVC) based methodology to calculate LLR parameters. NVC means that the post effective channel gain and noise power are directly calculated without inserting UW.

According to a first aspect of the present invention, there is provided an apparatus for Low-density parity-check (LDPC) decoding, the apparatus comprising a post effective noise variance estimation unit for estimating a post effective noise variance based on a preamble in a received signal, a log-likelihood ratio (LLR) calculation unit for calculating an LLR based on the estimated post effective noise variance, and a decoding unit for performing LDPC decoding based on the calculated LLR.

Preferably, the post effective noise variance estimation unit comprises a channel frequency response estimation unit for estimating a channel frequency response based on the preamble in the received signal, a noise variance estimation unit for estimating a noise variance based on the preamble in the received signal, and a post effective noise variance calculation unit for calculating the post effective noise variance based on the channel frequency response and the noise variance.

Preferably, the post effective noise variance calculation unit calculates the post effective noise variance based on the following equation:

$$\tilde{\sigma}_k^2 = tr\left(\sigma^2 \hat{H}_k^H \left(\hat{H}_k^H \hat{H}_k + I_N \frac{1}{\gamma}\right)^{-1} \hat{H}_k\right)/N$$

wherein $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes a SNR (Signal-to-Noise Ratio) of the received signal with $\gamma=\rho/\sigma^2$, $\rho$ being power of the received signal, and $I_N$ is a N×N identity matrix with N being a positive integer.

Preferably, the LLR calculation unit calculates the LLR based on the following equation:

$$q = \frac{2}{\tilde{\sigma}_k^2}\tilde{r}_k$$

wherein $\tilde{\sigma}_k^2$ denotes the post effective noise variance and $\tilde{r}^k$ denotes the received signal.

Preferably, the apparatus is applied in 60-GHz Millimeter-Way wireless communications.

According to a second aspect of the present invention, there is provided a method for Low-density parity-check (LDPC) decoding, the method comprising the steps of estimating a post effective noise variance based on a preamble in a received signal, calculating a log-likelihood ratio (LLR) based on the estimated post effective noise variance, and performing LDPC decoding based on the calculated LLR.

Preferably, the step of estimating the post effective noise variance based on the preamble in the received signal comprises: estimating a channel frequency response based on the preamble in the received signal, estimating a noise variance based on the preamble in the received signal, and calculating the post effective noise variance based on the channel frequency response and the noise variance.

Preferably, the step of calculating the post effective noise variance based on the channel frequency response and the noise variance calculates the post effective noise variance based on the following equation:

$$\tilde{\sigma}_k^2 = tr\left(\sigma^2 \hat{H}_k^H \left(\hat{H}_k^H \hat{H}_k + I_N \frac{1}{\gamma}\right)^{-1} \hat{H}_k\right) \Big/ N$$

wherein $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes a SNR (Signal-to-Noise Ratio) of the received signal with $\gamma = \rho/\sigma^2$, $\rho$ being power of the received signal, and $I_N$ is a N×N identity matrix with N being a positive integer.

Preferably, the step of calculating the LLR based on the estimated post effective noise variance calculates the LLR based on the following equation:

$$q = \frac{2}{\tilde{\sigma}_k^2} \tilde{r}_k$$

wherein $\tilde{\sigma}_k^2$ denotes the post effective noise variance and $\tilde{r}_k$ denotes the received signal.

Preferably, the method is applied in 60-GHz Millimeter-Wav wireless communications.

According to a third aspect of the present invention, there is provided a receiving terminal for Low-density parity-check (LDPC) decoding, the receiving terminal comprising a receiving unit for receiving a signal, a frequency domain equalization (FDE) processing unit for FDE processing the received signal, a post effective noise variance estimation unit for estimating a post effective noise variance based on a preamble in the received signal, a log-likelihood ratio (LLR) calculation unit for calculating an LLR based on the estimated post effective noise variance, and a decoding unit for performing LDPC decoding on the FDE processed signal based on the calculated LLR.

Preferably, the post effective noise variance estimation unit comprises a channel frequency response estimation unit for estimating a channel frequency response based on the preamble in the received signal, a noise variance estimation unit for estimating a noise variance based on the preamble in the received signal, and a post effective noise variance calculation unit for calculating the post effective noise variance based on the channel frequency response and the noise variance.

Preferably, the post effective noise variance calculation unit calculates the post effective noise variance based on the following equation:

$$\tilde{\sigma}_k^2 = tr\left(\sigma^2 \hat{H}_k^H \left(\hat{H}_k^H \hat{H}_k + I_N \frac{1}{\gamma}\right)^{-1} \hat{H}_k\right) \Big/ N$$

wherein $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes a Signal-to-Noise Ratio (SNR) of the received signal with $\gamma = \rho/\sigma^2$, $\rho$ being power of the received signal, and $I_N$ is a N×N identity matrix with N being a positive integer.

Preferably, the LLR calculation unit calculates the LLR based on the following equation:

$$q = \frac{2}{\tilde{\sigma}_k^2} \tilde{r}_k$$

wherein $\tilde{\sigma}_k^2$ denotes the post effective noise variance and $\tilde{r}_k$ denotes the FDE processed signal.

Preferably, the FDE processing unit performs pulse filtering, de-multiplexing, guard interval (GI) removal, Fast Fourier transform (FFT), minimum mean squared error FDE (MMSE-FDE), and Inverse FFT (IFFT).

Preferably, the FDE processing unit performs pulse filtering, de-multiplexing, guard interval (GI) removal, Fast Fourier transform (FFT), zero-forcing FDE (ZF-FDE), and Inverse FFT (IFFT).

Preferably, the receiving terminal is applied in 60-GHz Millimeter-Way wireless communications.

The present invention has the following advantages:
More accurately calculated post effective channel gain and noise variance can be provided;
More accurate LLR information can be provided to the receiver for LDPC decoding; and
It can be flexibly applicable to various SC-FDE frame structures.

BRIEF DESCRIPTION OF THE DRAWINGS

These and other objects, features and advantages of the invention will become apparent from the embodiments of the present invention presented hereinafter which makes reference to the appended figures, in which.

DETAILED DESCRIPTION OF PREFERRED EMBODIMENTS

In the following, the present invention will be described in detail with reference to the figures. The details and functions that are not required to the present invention are omitted herein in order not to unnecessarily obscure understanding to the present invention.

Figure 4:
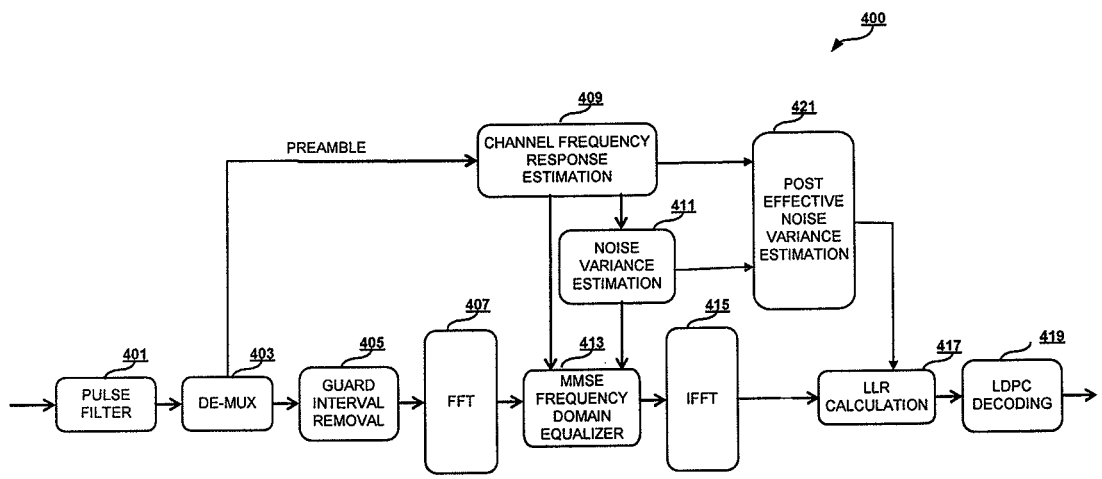
FIG. 4 is a block diagram showing a SC-FDE receiver 400 for LDPC decoding according to an embodiment of the present invention.

FIG. 4 is a block diagram showing a SC-FDE receiver 400 for LDPC decoding according to an embodiment of the present invention. Pulse filter 401, demultiplexer 403, guard interval removal unit 405, FFT unit 407, channel frequency response estimation unit 409, noise variance estimation unit 411, MMSE frequency domain equalizer 413, IFFT unit 415, LLR calculation unit 417 and LDPC decoding unit 419 shown in FIG. 4 are similar to those shown in FIGS. 1 and 2 in functions, and the detailed description thereof are omitted here.

As shown in FIG. 4, receiver 400 differs from receivers 100 and 200 by LLE calculation unit 417 and post effective noise variance estimation unit 421. More particularly, post effective noise variance estimation unit 421 estimates a post effective noise variance based on the channel frequency response obtained by channel frequency response estimation unit 409 and the noise variance obtained by noise variance estimation unit 411, and outputs the post effective noise variance to LLR calculation unit 417, which calculates an LLR for LDPC decoding based on the post effective noise variance.

In the present invention, post effective noise variance estimation unit 421 calculates a post effective noise variance by $$\hat{\sigma}_k^2 = tr\left(\sigma^2 \hat{H}_k^H \left(\hat{H}_k^H \hat{H}_k + I_N \frac{1}{\gamma}\right)^{-1} \hat{H}_k\right)/N$$

where $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes a SNR (Signal-to-Noise Ratio) of the received signal with $\gamma=\rho/\sigma^2$, $\rho$ being power of the received signal, and $I_N$ is a N×N identity matrix with N being a positive integer.

Further, LLR calculation unit 417 differs from LLR calculation unit 117 and LLR calculation unit 217 in that it calculates LLR by utilizing the post effective noise variance obtained by the post effective noise variance estimation unit 421 by $$q = \log\frac{Pr(s=0\mid \tilde{r}_k, \alpha)}{Pr(s=1\mid \tilde{r}_k, \alpha)} = \frac{2}{\hat{\sigma}_k^2}\tilde{r}_k$$

where $\tilde{r}_k$ is the output signal of the MMSE frequency domain equalizer 413.

Figure 5:
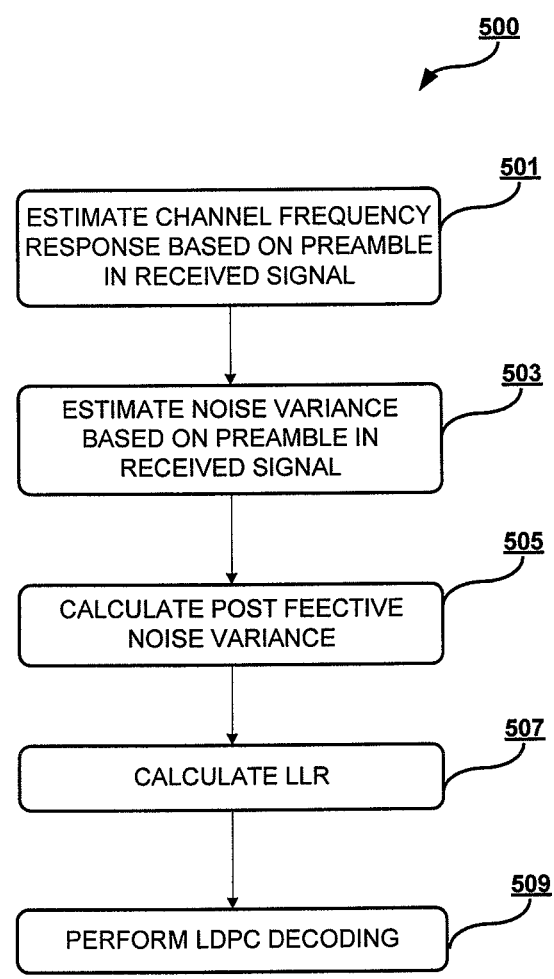
FIG. 5 is a flowchart illustrating a LDPC decoding method according to an embodiment of the present invention.

FIG. 5 is a flowchart illustrating a LDPC decoding method 500 according to an embodiment of the present invention.

As shown in FIG. 5, in step S501, the channel frequency response is estimated from the preamble in the received signal.

Figure 1:
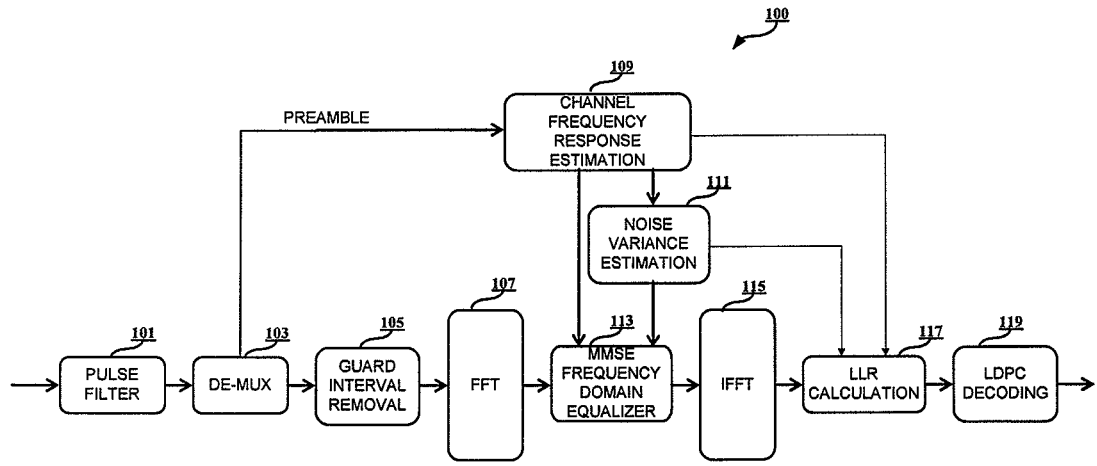
FIG. 1 is a block diagram showing a conventional SC-FDE receiver 100 for LDPC decoding.
Figure 2:
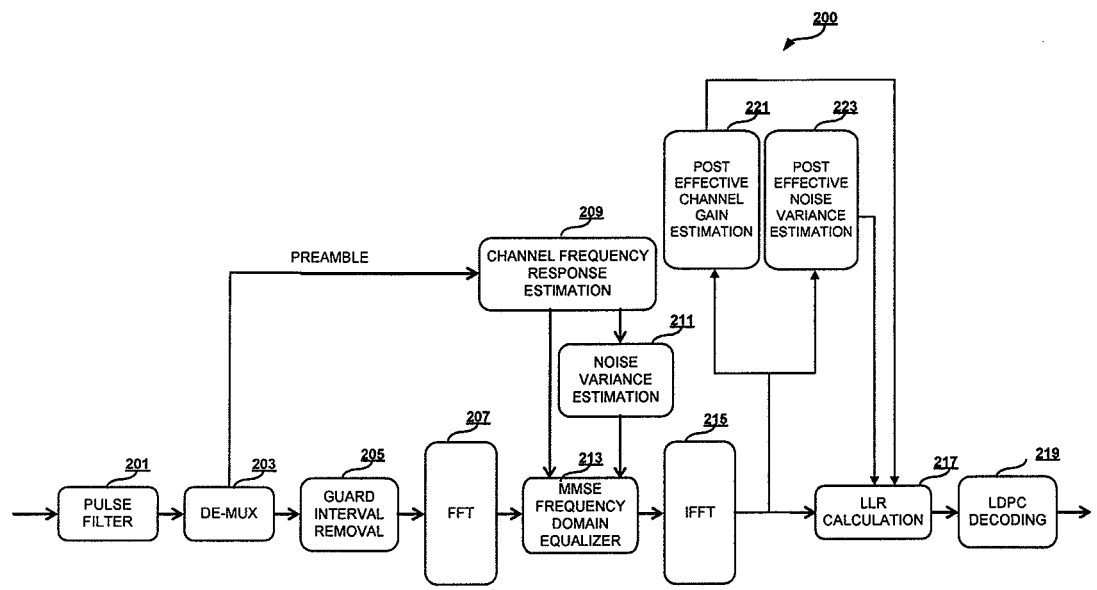
FIG. 2 is a block diagram showing a receiver 200 for LDPC decoding by using the VC based LLR calculation method.
Figure 3:
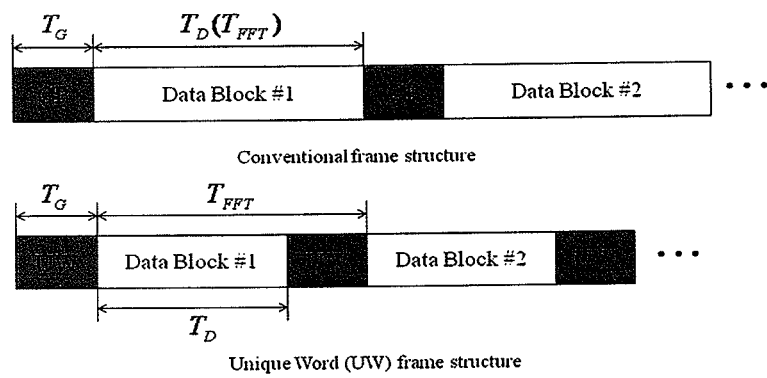
FIG. 3 shows a conventional frame structure and a UW based frame structure for SC-FDE.

Here, the channel frequency response is estimated directly from the preamble, and it can be done in the channel estimation unit shown in FIG. 1.

After that, in step S503, a noise variance is estimated based on the preamble in the received signal.

Next, in step S505, a post effective noise variance is calculated based on the channel frequency response obtained in step S501 and the noise variance obtained in step S503.

Here, the post effective noise variance can be taken as the noise variance obtained after IFFT of the received signal.

In the present invention, the post effective noise variance can be calculated by $$\hat{\sigma}_k^2 = tr\left(\sigma^2 \hat{H}_k^H \left(\hat{H}_k^H \hat{H}_k + I_N \frac{1}{\gamma}\right)^{-1} \hat{H}_k\right)/N$$

where $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes a SNR (Signal-to-Noise Ratio) of the received signal with $\gamma=\rho/\sigma^2$, $\rho$ being power of the received signal, and $I_N$ is a N×N identity matrix with N being a positive integer.

Next, in step S507, an LLR is calculated based on the post effective noise variance calculated in step S505 by $$q = \log\frac{Pr(s=0\mid \tilde{r}_k, \alpha)}{Pr(s=1\mid \tilde{r}_k, \alpha)} = \frac{2}{\hat{\sigma}_k^2}\tilde{r}_k$$

where $\tilde{r}_k$ is the received signal.

Finally, in step S509, the LLR calculated in step S507 is used for LDPC decoding.

The concept of the LLR calculation methodology (i.e., that of the LLR calculation unit 417 and the post effective noise variance estimation unit 421 shown in FIG. 4) used in the LDPC decoding method shown in FIG. 5 is described with reference to the system model as shown in FIG. 4 in detail below.

For simplicity, we first rewrite the system model shown in FIG. 4 in vector forms.

After CP/GI removal of FIG. 4, the received k-th block length-N vector $r_k$ is expressed as (N denotes the length of FFT block)

$$r_k = H_k x_k + n_k \tag{10}$$

Here, $H_k$ is a N×N circulant matrix representing the channel at time k. More precisely, $$H_k = \begin{pmatrix} h_0^k & 0 & \cdots & h_{L-1}^k & \cdots & h_1^k \\ \vdots & h_0^k & \ddots & 0 & \ddots & \vdots \\ h_{L-1}^k & \vdots & \ddots & \vdots & \ddots & h_{L-1}^k \\ 0 & h_{L-1}^k & \vdots & \ddots & \ddots & 0 \\ \vdots & \vdots & \ddots & \vdots & \ddots & \vdots \\ 0 & \cdots & 0 & h_{L-1}^k & \cdots & h_0^k \end{pmatrix} \tag{11}$$

where $h_m^k$ is the m-th complex tap coefficient of the CIR at time k; L is the channel length; $x_k$ is the length-N transmitted signal vector; $n_k$ is a length-N vector containing uncorrelated, zero-mean, complex white Gaussian noise samples, each with variance of $\sigma^2$.

Performing FFT to transform the time domain samples to the frequency domain, we have $$\hat{r}_k = FH_k x_k + Fn_k \tag{12}$$

where F corresponds to $$H_k = \begin{pmatrix} \omega_N^{0,0} & \omega_N^{0,1} & \cdots & \omega_N^{0,(N-1)} \\ \omega_N^{1,0} & \omega_N^{1,1} & \cdots & \omega_N^{1,(N-1)} \\ \vdots & \vdots & \ddots & \vdots \\ \omega_N^{(N-1),0} & \omega_N^{(N-1),1} & \cdots & \omega_N^{(N-1),(N-1)} \end{pmatrix} \tag{13}$$

-continued where $$\omega_N^{p,q} = \frac{1}{\sqrt{N}} e^{-j2\pi pq/N}.$$

Equation (12) can be rewritten as $$\hat{r}_k = FH_k F^H Fx_k + Fn_k \quad (14)$$
$$= \hat{H}_k \hat{x}_k + \hat{n}_k,$$

Here, $\hat{x}_k = Fx_k$ and $\hat{n}_k = Fn_k$ are frequency domain samples, $\hat{H}_k = FH_k F^H$ is a diagonal matrix with the CFR coefficients as its diagonal elements.

In order to minimize the MSE between the received signal and the original signal, MMSE-FDE is employed. The MMSE-FDE coefficients are calculated as $$C_k = \hat{H}_k^H \left( \hat{H}_k^H \hat{H}_k + I_N \frac{1}{\gamma} \right)^{-1}, \quad (15)$$

where $I_N$ is a N×N identity matrix, $\gamma = \rho/\sigma^2$ is the received SNR with transmit signal power $E(x_k x_k^H) = \rho$. Then, the output signal of the MMSE-FDE is given as $$\bar{r}_k = C_k \hat{H}_k \hat{x}_k + C_k \hat{n}_k. \quad (16)$$

After all, performing IFFT, the data samples are transformed from the frequency domain back to the time domain, i.e., $$\tilde{r}_k = F^H C_k \hat{H}_k \hat{x}_k + F^H C_k \hat{n}_k. \quad (17)$$

By substituting equation (15) into equation (17), we have $$\tilde{r}_k = F^H \hat{H}_k^H \left( \hat{H}_k^H \hat{H}_k + I_N \frac{1}{\gamma} \right)^{-1} \hat{H}_k Fx_k + F^H \hat{H}_k^H \left( \hat{H}_k^H \hat{H}_k + I_N \frac{1}{\gamma} \right)^{-1} Fn_k \quad (18)$$

$$= x_k + \left[ F^H \hat{H}_k^H \left( \hat{H}_k^H \hat{H}_k + I_N \frac{1}{\gamma} \right)^{-1} \hat{H}_k F - I_N \right] x_k + \quad (19)$$

$$F^H \hat{H}_k^H \left( \hat{H}_k^H \hat{H}_k + I_N \frac{1}{\gamma} \right)^{-1} Fn_k.$$

The first term of equation (19) is the desired signal, the second term is the residual ISI, and the last term is the enhanced noise samples. Since MMSE-FDE can well suppress the ISI, the second term of equation (19) is negligible.

Hence, if the residual ISI denoted by the second term in equation (19) is omitted, the equation (19) can be approximated as $$\tilde{r}_k = x_k + F^H \hat{H}_k^H \left( \hat{H}_k^H \hat{H}_k + I_N \frac{1}{\gamma} \right)^{-1} Fn_k, \quad (20)$$
$$= x_k + \tilde{n}_k$$

where $$\tilde{n}_k = F^H \hat{H}_k^H \left( \hat{H}_k^H \hat{H}_k + I_N \frac{1}{\gamma} \right)^{-1} Fn_k.$$

From equation (20), it can be seen that the pose effective channel gain $\alpha$ actually corresponds to unity. The only remaining operation is to obtain the post effective noise power $\tilde{\sigma}_k^2$. The covariance matrix of $\tilde{n}_k$ is calculated as $$\Sigma_k = E(\tilde{n}_k \tilde{n}_k^H) \quad (21)$$
$$= \sigma^2 F^H C_k C_k^H F$$

Then, we have $$\tilde{\sigma}_k^2 = tr(\Sigma_k)/N \quad (22)$$
$$= tr(\sigma^2 F^H C_k C_k^H F)/N$$
$$= tr(\sigma^2 C_k C_k^H)/N$$
$$= tr\left( \sigma^2 \hat{H}_k^H \left( \hat{H}_k^H \hat{H}_k + I_N \frac{1}{\gamma} \right)^{-1} \hat{H}_k \right)/N$$

where tr(.) represents the matrix trace operation. Therefore, the LLR is calculated as $$q = \log \frac{Pr(s=0 | \tilde{r}_k, \alpha)}{Pr(s=1 | \tilde{r}_k, \alpha)} = \frac{2}{\tilde{\sigma}_k^2} \tilde{r}_k. \quad (23)$$

Here, the CFR $\hat{H}_k$ and the noise variance $\sigma^2$ in equation (22) are obtained based on the preambles.

If we take the residual ISI into account, the undesired signal from equation (19) (i.e., the second term) can be formulated as $$\tilde{u}_k = \left[ F^H \hat{H}_k^H \left( \hat{H}_k^H \hat{H}_k + I_N \frac{1}{\gamma} \right)^{-1} \hat{H}_k F - I_N \right] x_k + \quad (24)$$

$$F^H \hat{H}_k^H \left( \hat{H}_k^H \hat{H}_k + I_N \frac{1}{\gamma} \right)^{-1} Fn_k$$

Then, we have $$\Sigma_k = E(\tilde{u}_k \tilde{u}_k^H). \quad (25)$$

Due to the fact that the data symbols and the noise samples are uncorrelated, equation (25) can be simplified as $$\Sigma_k = \rho B_k B_k^H + \sigma^2 F^H C_k C_k^H F, \quad (26)$$

where $$B_k = F^H \hat{H}_k^H \left( \hat{H}_k^H \hat{H}_k + I_N \frac{1}{\gamma} \right)^{-1} \hat{H}_k F - I_N.$$

The interference power (both residual ISI and enhanced noise) can be similarly calculated according to equation (22), and so does LLR. It is worth mentioning here that the performance improvements obtained by taking the residual ISI into account over the scenario only considering noise enhancement is very limited (in the order of 0.05 dB), but with significantly increased computational complexity.

Figure 6:
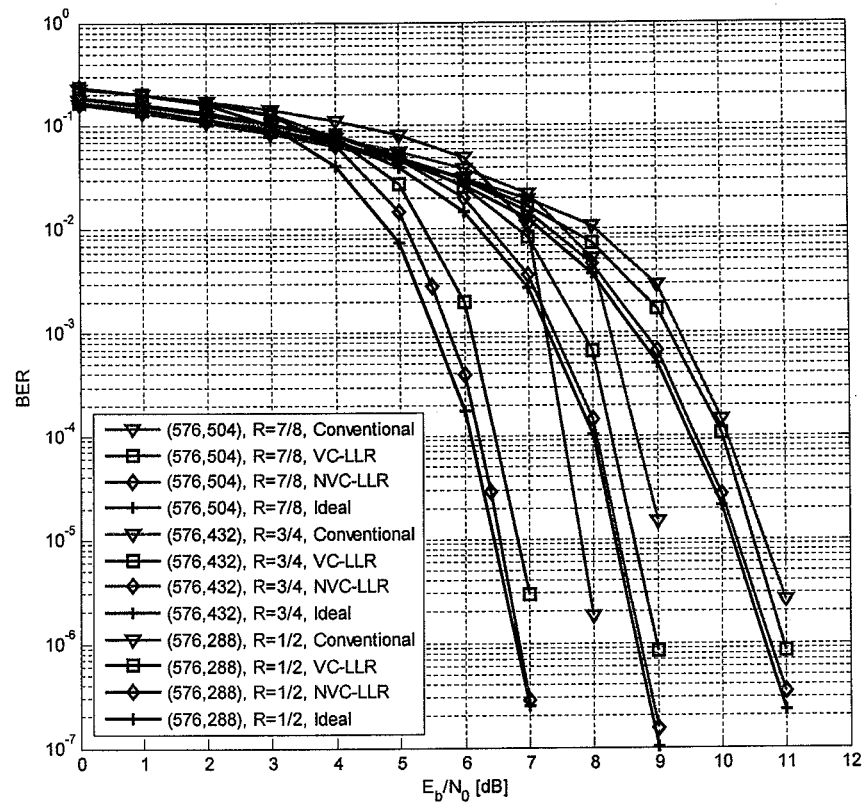
FIG. 6 is a chart illustrating simulation result of Bit Error Rate (BER) performance of SC-FDE performing LDPC encoding by utilizing various LLR calculation methods.

FIG. 6 is a chart illustrating simulation result of the BER performance of the ideal case, conventional, VC based and NVC based LLR calculation schemes under the simulation condition listed in Table 1 below.

TABLE 1

| simulation condition | |
|---|---|
| Channel model | NLOS Residential |
| Symbol rate | 1.632 GHz |
| Roll-off factor | 0.3235 |
| Modulation | BPSK |
| Channel coding | Irregular structured LDPC codes (576,288), R = 1/2 (576,432), R = 3/4 (576,504), R = 7/8 |
| Max. decoding iterations | 64 |
| FFT/IFFT length | 256 |
| GI length | 64 |
| Synchronization | Ideal |
| Channel estimation | Ideal |
| FDE | MMSE-FDE |

From FIG. 6, we observe that the present invention outperforms both the conventional and the VS based schemes in terms of the BER. For example, at the BER level of $10^{-4}$ and LDPC coding rate of ½, the NVC based scheme exhibits 0.5 dB SNR gain over the VC based scheme. This gain grows to nearly 2 dB in contrast to the conventional method. Furthermore, the performance of the NVC based scheme approaches that of the ideal case. For instance, at LDPC coding rates of ⅞ and ¾, the NVC based scheme shows almost the same BER performance as the ideal case.

Next, the VC based LLR calculation scheme and the NVC based LLR calculation scheme are compared in terms of the computational complexity and spectral efficiency with reference to Table 2 below.

TABLE 2 comparison of VC and NVC based LLR calculation scheme in terms of the computational complexity and spectral efficiency

| | Complexity (MADs) | Spectral Efficiency |
|---|---|---|
| VC based scheme | 320 | 75% |
| NVC based scheme | 512 | 100% |

From Table 2, we can see that NVC based scheme is more spectrally efficient than the VC based scheme per FFT block.

Figure 7:
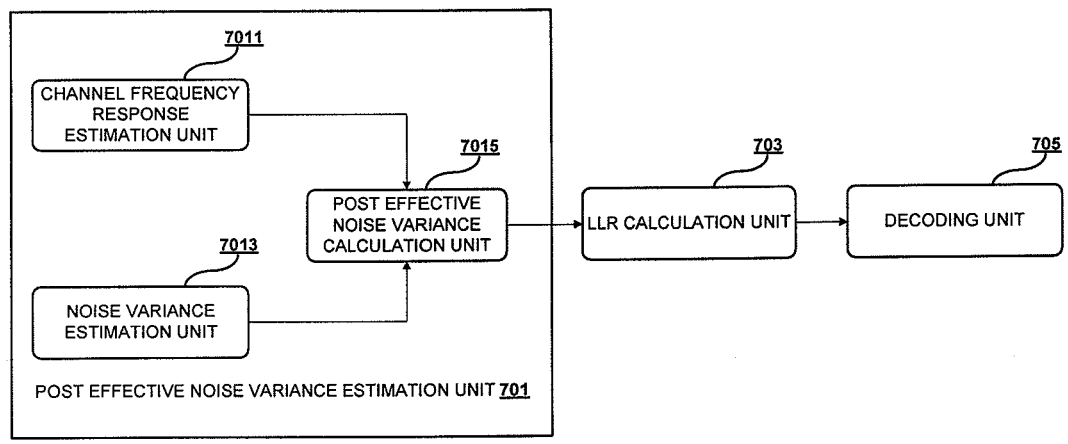
FIG. 7 is a structural block diagram showing an LPDC apparatus 700 according to an embodiment of the present invention.

FIG. 7 is a block diagram showing an LPDC apparatus 700 according to an embodiment of the present invention.

As shown in FIG. 7, LPDC apparatus 700 comprises post effective noise variance estimation unit 701 for estimating a post effective noise variance based on the preamble in the received signal, LLR calculation unit 703 for calculating an LLR based on the estimated post effective noise variance, and decoding unit 705 for performing LDPC decoding based on the calculated LLR. The post effective noise variance estimation unit 701 further comprises channel frequency response estimation unit 7011 for estimating a channel frequency response based on the preamble in the received signal, noise variance estimation unit 7013 for estimating a noise variance based on the preamble in the received signal, and post effective noise variance calculation unit 7015 for calculating a post effective noise variance based on the channel frequency response and the noise variance.

Here, the post effective noise variance can be taken as the noise variance obtained after IFFT of the received signal.

In the present invention, post effective noise variance estimation unit 7015 calculates a post effective noise variance by $$\hat{\sigma}_k^2 = tr\left(\sigma^2 \hat{H}_k^H \left(\hat{H}_k^H \hat{H}_k + I_N \frac{1}{\gamma}\right)^{-1} \hat{H}_k\right) / N$$

where $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes a SNR (Signal-to-Noise Ratio) of the received signal with $\gamma = \rho/\sigma^2$, $\rho$ being power of the received signal, and $I_N$ is a N×N identity matrix with N being a positive integer.

Further, in the present invention, LLR calculation unit 703 calculates an LLR based on the post effective noise variance by $$q = \log \frac{Pr(s=0 | \tilde{r}_k, \alpha)}{Pr(s=1 | \tilde{r}_k, \alpha)} = \frac{2}{\hat{\sigma}_k^2} \tilde{r}_k$$

where $\tilde{r}_k$ is the received signal.

Although the post effective noise variance estimation unit 701 is shown as a discrete unit with respect to the LLR calculation unit 703 in the drawing, it can be recognized by a skilled in the art the post effective noise variance estimation unit 701 may be integrated in the LLR calculation unit 703 instead of being discrete units.

Figure 8:
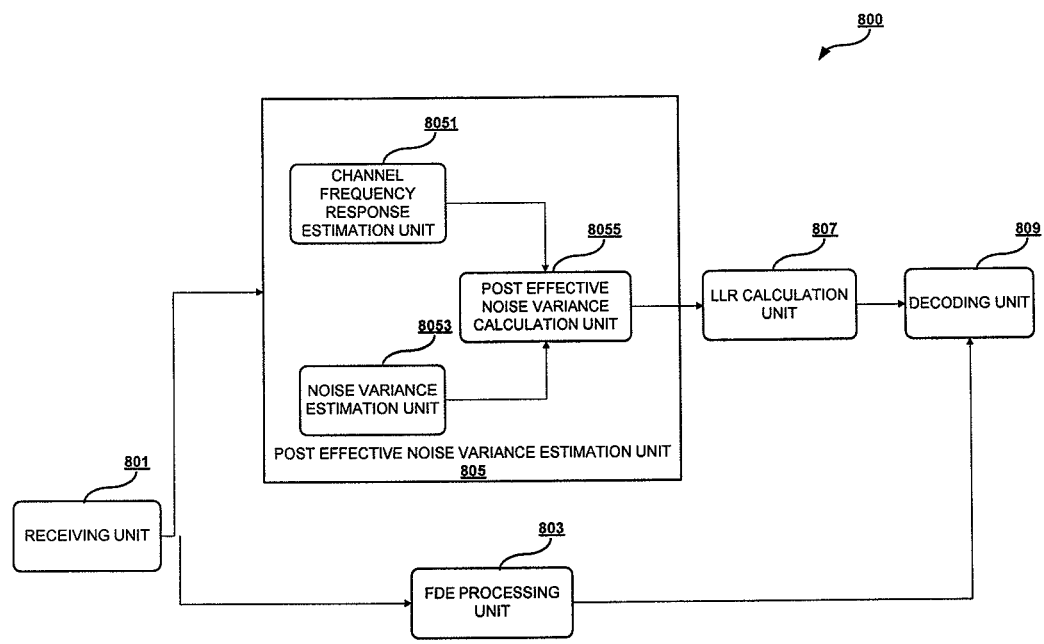
FIG. 8 is a structural block diagram showing a receiving terminal 800 according to an embodiment of the present invention.

FIG. 8 is a block diagram showing a receiving terminal 800 according to an embodiment of the present invention.

As shown in FIG. 8, the receiving terminal 800 comprises receiving unit 801 for receiving a signal, a frequency domain FDE processing unit 803 for performing FDE on the received signal, post effective noise variance estimation unit 805 for estimating a post effective noise variance based on the preamble in the received signal, LLR calculation unit 807 for calculating an LLR based on the estimated post effective noise variance, and a decoding unit 809 for performing LDPC decoding on the signal that is subjected to FDE processing in the FDE processing unit 803 based on the calculated LLR. The post effective noise variance estimation unit 805 further comprises channel frequency response estimation unit 8051 for estimating a channel frequency response based on the preamble in the received signal, noise variance estimation unit 8053 for estimating a noise variance based on the preamble in the received signal, and post effective noise variance calculation unit 8055 for calculating a post effective noise variance based on the channel frequency response and the noise variance.

According to the embodiment of the present invention, post effective noise variance estimation unit 8055 calculates a post effective noise variance by $$\hat{\sigma}_k^2 = tr\left(\sigma^2 \hat{H}_k^H \left(\hat{H}_k^H \hat{H}_k + I_N \frac{1}{\gamma}\right)^{-1} \hat{H}_k\right) / N$$

where $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes a SNR (Signal-to-Noise Ratio) of the received signal with $\gamma = \rho/\sigma^2$, $\rho$ being power of the received signal, and $I_N$ is a N×N identity matrix with N being a positive integer.

Further, in the present invention, LLR calculation unit 807 calculates an LLR based on the post effective noise variance by $$q = \log\frac{Pr(s=0|\tilde{r}_k, \alpha)}{Pr(s=1|\tilde{r}_k, \alpha)} = \frac{2}{\tilde{\sigma}_k^2}\tilde{r}_k$$

where $\tilde{r}_k$ is the received signal.

Furthermore, frequency domain FDE processing unit 803 performs pulse filtering, de-multiplexing, guard interval removal, Fast Fourier Transform (FFT), minimum mean squared error FDE (MMSE-FDE) and Inverse FFT (IFFT). Alternatively, the present invention can use ZF-FDE instead of MMSE-FDE.

Although the post effective noise variance estimation unit 805 is shown as a discrete unit with respect to the LLR calculation unit 807 in the drawing, it can be recognized by a skilled in the art the post effective noise variance estimation unit 805 may be integrated in the LLR calculation unit 807 instead of being discrete units.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations implementing the scheme as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data processing device.

The foregoing description gives only the preferred embodiments of the present invention and is not intended to limit the present invention in any way. Thus, any modification, substitution, improvement or like made within the spirit and principle of the present invention should be encompassed by the scope of the present invention.

What is claimed is:

1. An apparatus for Low-density parity-check (LDPC) decoding, the apparatus comprising:
a post effective noise variance estimation unit for estimating a post effective noise variance based on a preamble in a received signal;
a log-likelihood ratio (LLR) calculation unit for calculating an LLR based on the estimated post effective noise variance; and
a decoding unit for performing LDPC decoding based on the calculated LLR,
wherein the post effective noise variance is estimated based on a channel frequency response, a noise variance and a Signal-to-Noise Ratio (SNR) of the received signal.

2. The apparatus according to claim 1, wherein the post effective noise variance estimation unit comprises:
a channel frequency response estimation unit for estimating the channel frequency response based on the preamble in the received signal;
a noise variance estimation unit for estimating the noise variance based on the preamble in the received signal; and
a post effective noise variance calculation unit for calculating the post effective noise variance based on the channel frequency response and the noise variance.

3. The apparatus according to claim 2, wherein the post effective noise variance calculation unit calculates the post effective noise variance based on the following equation:

$$\tilde{\sigma}_k^2 = tr\left(\sigma^2 \hat{H}_k^H \left(\hat{H}_k^H \hat{H}_k + I_N \frac{1}{\gamma}\right)^{-1} \hat{H}_k\right)/N$$

wherein $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes the SNR (Signal-to-Noise Ratio) of the received signal with $\gamma=\rho/\sigma^2$, $\rho$ being power of the received signal, and $I_N$ is a N×N identity matrix with N being a positive integer.

4. The apparatus according to claim 1, wherein the LLR calculation unit calculates the LLR based on the following equation:

$$q = \frac{2}{\tilde{\sigma}_k^2}\tilde{r}_k$$

wherein $\tilde{\sigma}_k^2$ denotes the post effective noise variance and $\tilde{r}_k$ denotes the received signal.

5. The apparatus according to claim 1, wherein the apparatus is applied in 60-GHz Millimeter-Wav wireless communications.

6. A method for Low-density parity-check (LDPC) decoding, the method comprising the following steps of:
estimating a post effective noise variance based on a preamble in a received signal;
calculating a log-likelihood ratio (LLR) based on the estimated post effective noise variance; and
performing LDPC decoding based on the calculated LLR,
wherein the post effective noise variance is estimated based on a channel frequency response, a noise variance and a Signal-to-Noise Ratio (SNR) of the received signal.

7. The method according to claim 6, wherein the step of estimating the post effective noise variance based on the preamble in the received signal comprises:
estimating the channel frequency response based on the preamble in the received signal;
estimating the noise variance based on the preamble in the received signal; and calculating the post effective noise variance based on the channel frequency response and the noise variance.

8. The method according to claim 7, wherein the step of calculating the post effective noise variance based on the channel frequency response and the noise variance calculates the post effective noise variance based on the following equation:

$$\tilde{\sigma}_k^2 = tr\left(\sigma^2 \hat{H}_k^H \left(\hat{H}_k^H \hat{H}_k + I_N \frac{1}{\gamma}\right)^{-1} \hat{H}_k\right) / N$$

wherein $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes the SNR (Signal-to-Noise Ratio) of the received signal with $\gamma = \rho/\sigma^2$, $\rho$ being power of the received signal, and $I_N$ is a N×N identity matrix with N being a positive integer.

9. The method according to claim 6, wherein the step of calculating the LLR based on the estimated post effective noise variance calculates the LLR based on the following equation:

$$q = \frac{2}{\tilde{\sigma}_k^2} \tilde{r}_k$$

wherein $\tilde{\sigma}_k^2$ denotes the post effective noise variance and $\tilde{r}_k$ denotes the received signal.

10. The method according to claim 6, wherein the method is applied in 60-GHz Millimeter-Wav wireless communications.

11. A receiving terminal for Low-density parity-check (LDPC) decoding, the receiving terminal comprising:
 a receiving unit for receiving a signal;
 a frequency domain equalization (FDE) processing unit for FDE processing the received signal;
 a post effective noise variance estimation unit for estimating a post effective noise variance based on a preamble in the received signal;
 a log-likelihood ratio (LLR) calculation unit for calculating an LLR based on the estimated post effective noise variance; and
 a decoding unit for performing LDPC decoding on the FDE processed signal based on the calculated LLR,
 wherein the post effective noise variance is estimated based on a channel frequency response, a noise variance and a Signal-to-Noise Ratio (SNR) of the received signal.

12. The receiving terminal according to claim 11, wherein the post effective noise variance estimation unit comprises:
 a channel frequency response estimation unit for estimating the channel frequency response based on the preamble in the received signal;
 a noise variance estimation unit for estimating the noise variance based on the preamble in the received signal; and
 a post effective noise variance calculation unit for calculating the post effective noise variance based on the channel frequency response and the noise variance.

13. The receiving terminal according to claim 12, wherein the post effective noise variance calculation unit calculates the post effective noise variance based on the following equation:

$$\tilde{\sigma}_k^2 = tr\left(\sigma^2 \hat{H}_k^H \left(\hat{H}_k^H \hat{H}_k + I_N \frac{1}{\gamma}\right)^{-1} \hat{H}_k\right) / N$$

wherein $\sigma^2$ denotes the noise variance estimated by the noise variance estimation unit, $\hat{H}_k$ is a diagonal matrix with the channel frequency response estimated by the channel frequency response estimation unit on its diagonal, $\gamma$ denotes the Signal-to-Noise Ratio (SNR) of the received signal with $\gamma = \rho/\sigma^2$, $\rho$ being power of the received signal, and $I_N$ is a N×N identity matrix with N being a positive integer.

14. The receiving terminal according to claim 11, wherein the LLR calculation unit calculates the LLR based on the following equation:

$$q = \frac{2}{\tilde{\sigma}_k^2} \tilde{r}_k$$

wherein $\tilde{\sigma}_k^2$ denotes the post effective noise variance and $\tilde{r}_k$ denotes the FDE processed signal.

15. The receiving terminal according to claim 11, wherein the FDE processing unit performs pulse filtering, de-multiplexing, guard interval (GI) removal, Fast Fourier transform (FFT), minimum mean squared error FDE (MMSE-FDE), and Inverse FFT (IFFT).

16. The receiving terminal according to claim 11, wherein the FDE processing unit performs pulse filtering, de-multiplexing, guard interval (GI) removal, Fast Fourier transform (FFT), zero-forcing FDE (ZF-FDE), and Inverse FFT (IFFT).

17. The receiving terminal according to claim 11, wherein the receiving terminal is applied in 60-GHz Millimeter-Wav wireless communications.

* * * * *